(12) United States Patent
Mead et al.

(10) Patent No.: US 10,624,279 B1
(45) Date of Patent: Apr. 21, 2020

(54) GRAPPLE CONTROL SYSTEM

(71) Applicant: Altec Industries, Inc., Birmingham, AL (US)

(72) Inventors: David Mead, Raleigh, NC (US); Thomas Marietta, Saint Joseph, MO (US)

(73) Assignee: Altec Industries, Inc., Birmingham, AL (US)

( * ) Notice: Subject to any disclaimer, the term of this patent is extended or adjusted under 35 U.S.C. 154(b) by 0 days.

(21) Appl. No.: 16/263,773

(22) Filed: Jan. 31, 2019

(51) Int. Cl.
| | |
|---|---|
| *A01G 23/091* | (2006.01) |
| *A01G 23/093* | (2006.01) |
| *B60P 3/41* | (2006.01) |
| *B66C 3/18* | (2006.01) |
| *B66C 1/68* | (2006.01) |
| *B66C 1/42* | (2006.01) |
| *A01G 23/00* | (2006.01) |

(52) U.S. Cl.
CPC ......... *A01G 23/091* (2013.01); *A01G 23/093* (2013.01); *B60P 3/41* (2013.01); *B66C 1/68* (2013.01); *B66C 3/18* (2013.01); *A01G 23/003* (2013.01); *B66C 1/42* (2013.01)

(58) Field of Classification Search
CPC .... A01G 23/08; A01G 23/081; A01G 23/083; A01G 23/091; A01G 23/093; A01G 23/095
See application file for complete search history.

(56) References Cited

U.S. PATENT DOCUMENTS

| | | | | | |
|---|---|---|---|---|---|
| 4,987,935 | A | * | 1/1991 | Corcoran | A01G 23/091 144/241 |
| 5,267,594 | A | * | 12/1993 | Wiemeri | A01G 23/091 144/336 |
| 7,306,018 | B2 | * | 12/2007 | Hicks | A01G 23/081 144/336 |
| 7,681,608 | B2 | * | 3/2010 | Disabatino | A01G 23/08 144/34.1 |
| 8,002,004 | B2 | * | 8/2011 | Smythe | A01G 23/095 144/24.13 |
| 10,066,644 | B2 | * | 9/2018 | Opdenbosch | F15B 11/0445 |
| 2015/0289456 | A1 | * | 10/2015 | Cudoc | A01G 23/097 144/429 |
| 2018/0125007 | A1 | * | 5/2018 | Gierkink | A01G 23/081 |

* cited by examiner

*Primary Examiner* — Matthew Katcoff
(74) *Attorney, Agent, or Firm* — Erise IP, P.A.

(57) ABSTRACT

A system and method for controlling a grapple is described in embodiments herein. A variable pressure control may be implemented that controls the pressure applied to a load held by the grapple. An interlock mechanism may be employed on the felling grapple that disables the operation of components of the felling grapple such as a feller. A grapple release mechanism may be activated to release the pressure applied to the load in the event of a malfunction in the felling grapple.

20 Claims, 12 Drawing Sheets

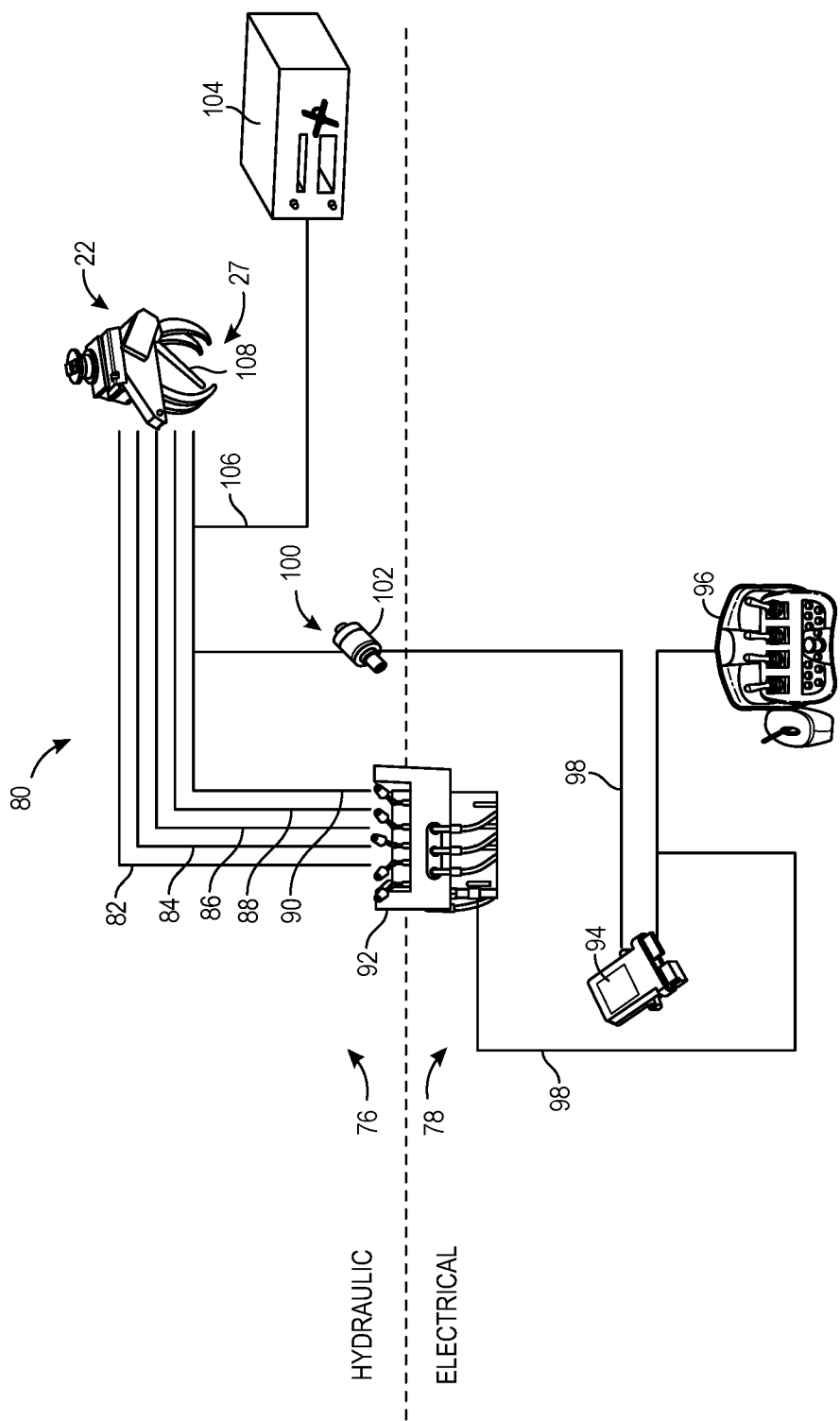

GRAPPLE CONTROL SYSTEM

RELATED APPLICATIONS

Embodiments and/or features of the invention described in the present document may be used with the subject matter disclosed in simultaneously filed U.S. Non-Provisional patent application Ser. No. 16/263,686, filed Jan. 31, 2019, and entitled "FELLING GRAPPLE FOR REMOVING ENERGIZED VEGETATION MATERIAL." The simultaneously filed application is hereby incorporated by reference in its entirety into the present application.

Embodiments and/or features of the invention described in the present document may be used with subject matter disclosed in commonly assigned U.S. U.S. Pat. No. 9,751,734, issued Sep. 5, 2017, and entitled "GRAPPLER OVERLOAD PROTECTION." The identified earlier-filed patent is hereby incorporated by reference in its entirety into the present application.

Embodiments and/or features of the invention described in the present document may be used with subject matter disclosed in commonly assigned previously filed U.S. patent application Ser. No. 16/053,219, issued Aug. 2, 2018, and entitled "A SYSTEM AND METHOD FOR DETECTING A CONTACT BETWEEN AN AERIAL DEVICE AND AN ELECTRICAL POWER SOURCE." The identified earlier-filed patent application is hereby incorporated by reference in its entirety into the present application.

BACKGROUND

1. Field

Embodiments of this invention relate to felling grapple control systems. More specifically, embodiments of the invention relate to controlling the gripping and releasing of a felling grapple.

2. Related Art

Typical felling grapples provide a grapple and a feller, in some instances a saw, for gripping and cutting a load such as, for example, tree limbs. The felling grapples grip a load and move or cut and place the load in a desired location. These felling grapple typically have no adjustability regarding the pressure imparted by the grapple on the load. The grip may result in pressure that damages the load. For example, a tree limb may grow near power lines and needs to be trimmed before the tree limb interferes with the power lines. The grapple may grip the limb near the trunk of a tree where the limb is to be trimmed. If the grapple grips too tightly the trunk of the tree may be damaged. Typically this occurs when the tree is of a soft wood variety such as pine, cedar, juniper, or the like.

What is needed is a system and method for controlling the amount of pressure that is imparted on the load. The pressure may be manually controlled by an operator that is operating a grapple. This may be performed by designating a pressure level while operating the grapple.

Further, typical felling grapples grip loads and cut the load with a feller, such as a saw or shears. If a load is not secure and in a holding mode prior to cutting, the load may shift causing the load to fall from the grapple and may damage the grapple and saw. Typical grapples use a counterbalance that is hard mounted to the cylinder and hoses run from a counterbalance valve at the grapple to a main control valve at a control valve turntable. This typical system does not allow for remote release of pressure from a fixed valve on the equipment to release a load in the event the grapple cylinder cannot be pressurized.

What is needed is a saw interlocking system and method that prevents the saw from activation until it is established that the grapple and load are in a secure position. The load should be locked into a hold position that is secure such that if the load moves in the grapple, the grapple may adjust to the movement preventing the load from falling. Once this state of the grapple is detected, the saw is made operational. Further, upon damage or malfunction of the grapple, a manual hold load deactivation may be engaged unlocking the device from the hold load state.

SUMMARY

Embodiments of the invention solve the above-mentioned problems by providing a grapple control system. The grapple control system provides multiple checks, interlocks, and control of the grapple. In some embodiments, a grapple gripping pressure is manually set by an operator to ensure that the grapple grips a load with a required pressure that may be indicative of the load. In some embodiments, a saw for trimming branches and trees is disabled unless a particular state of the grapple is achieved or a grip pressure is sensed. Further, a manual release mechanism is provided that allows manual release of a grapple load in the event of a malfunction.

A first embodiment is directed to a felling grapple for gripping a load comprising a grapple comprising at least one tine for gripping the load, a feller configured to cut the load, and a sensor configured to measure a pressure indicative of a pressure applied to the load by the at least one tine gripping the load.

A second embodiment is directed to a method of grappling comprising the steps of receiving a maximum gripping pressure setting from an operator, measuring, with a sensor, a pressure indicative of a pressure applied to the load by the grapple, and controlling the pressure applied by the grapple such that the indicative pressure is at or below the maximum gripping pressure.

A third embodiment is directed to a method of handling a load by a felling grapple comprising the steps of measuring, with a sensor, a pressure indicative of a pressure applied to the load by the grapple, and securing the load in the grapple by operating a valve such that pressurized hydraulic fluid is supplied to the grapple, wherein the pressurized hydraulic fluid is under a substantially constant pressure.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages will be apparent from the following detailed description of the embodiments and the accompanying drawing figures.

BRIEF DESCRIPTION OF THE DRAWING FIGURES

Embodiments of this disclosure are described in detail below with reference to the attached drawing figures, wherein.

Figure 4A:
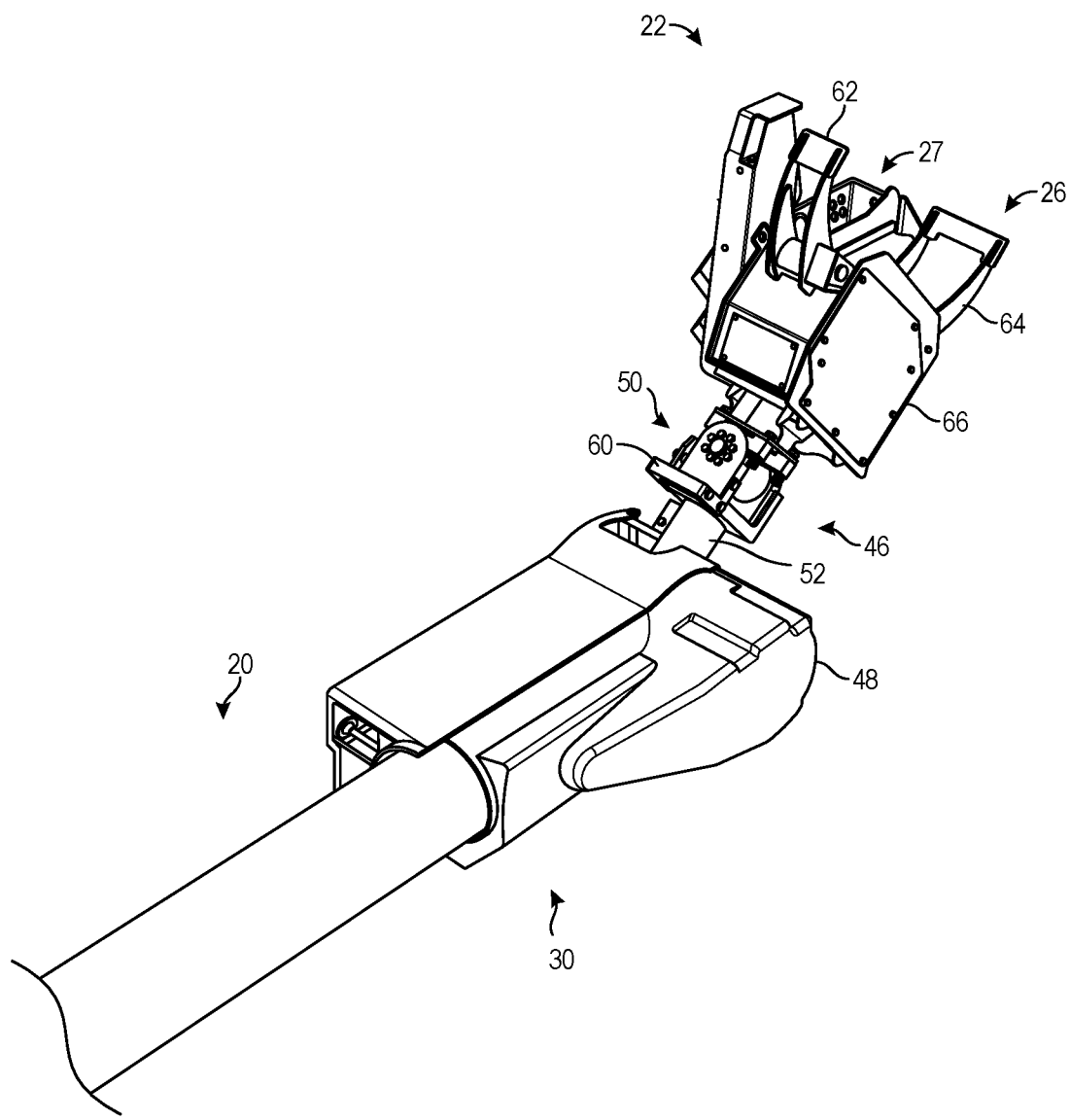
Figure 4B:
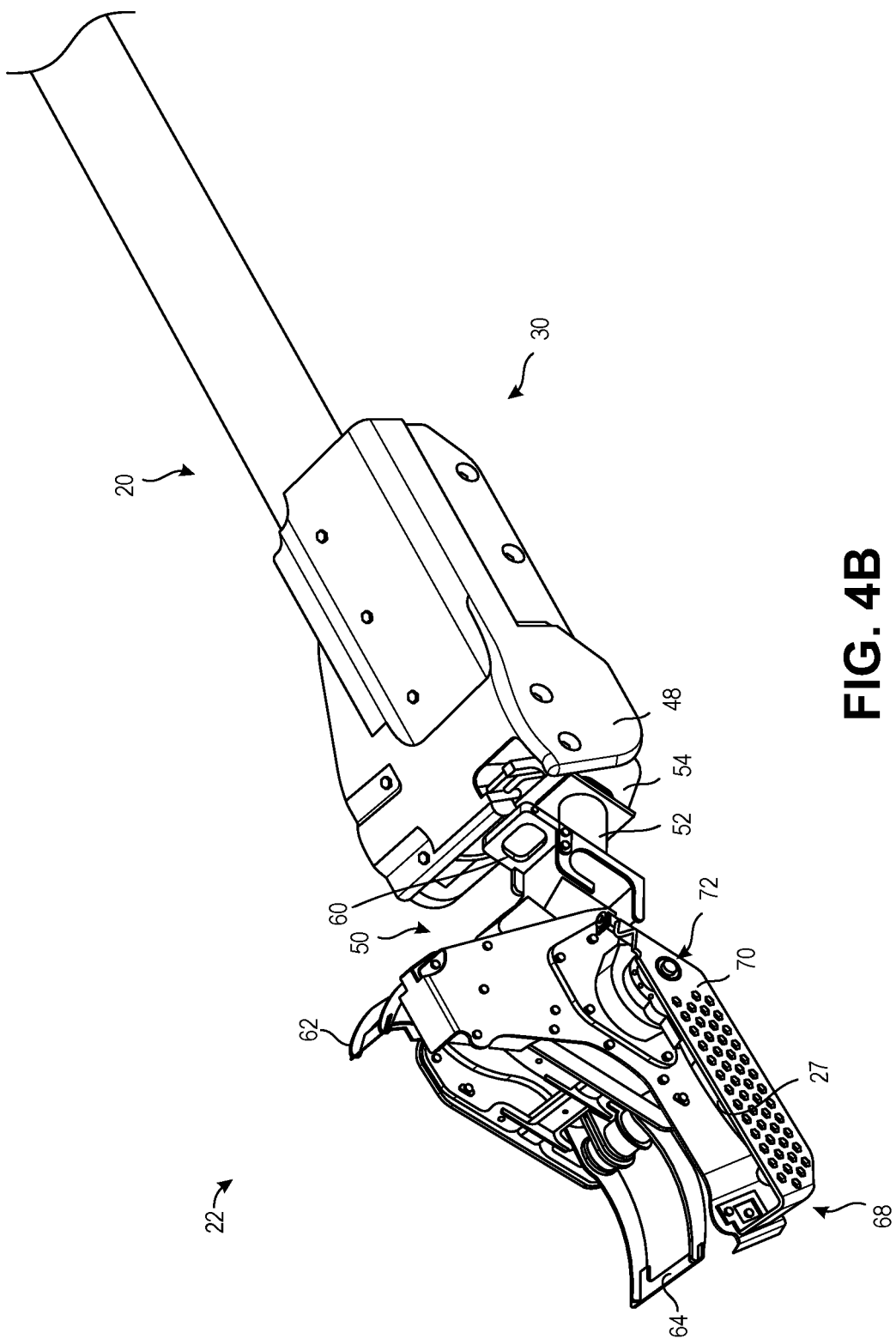
Figure 4C:
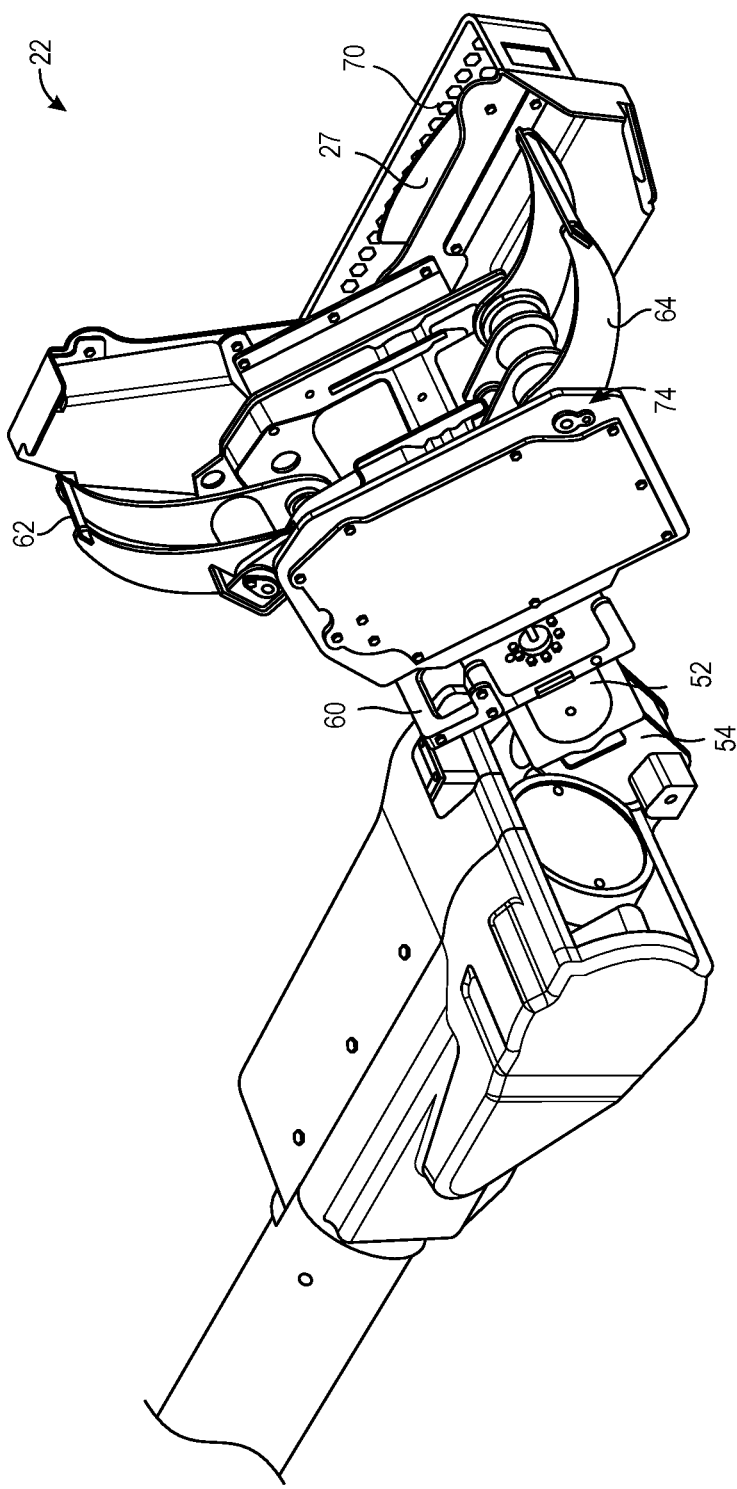
Figure 6:
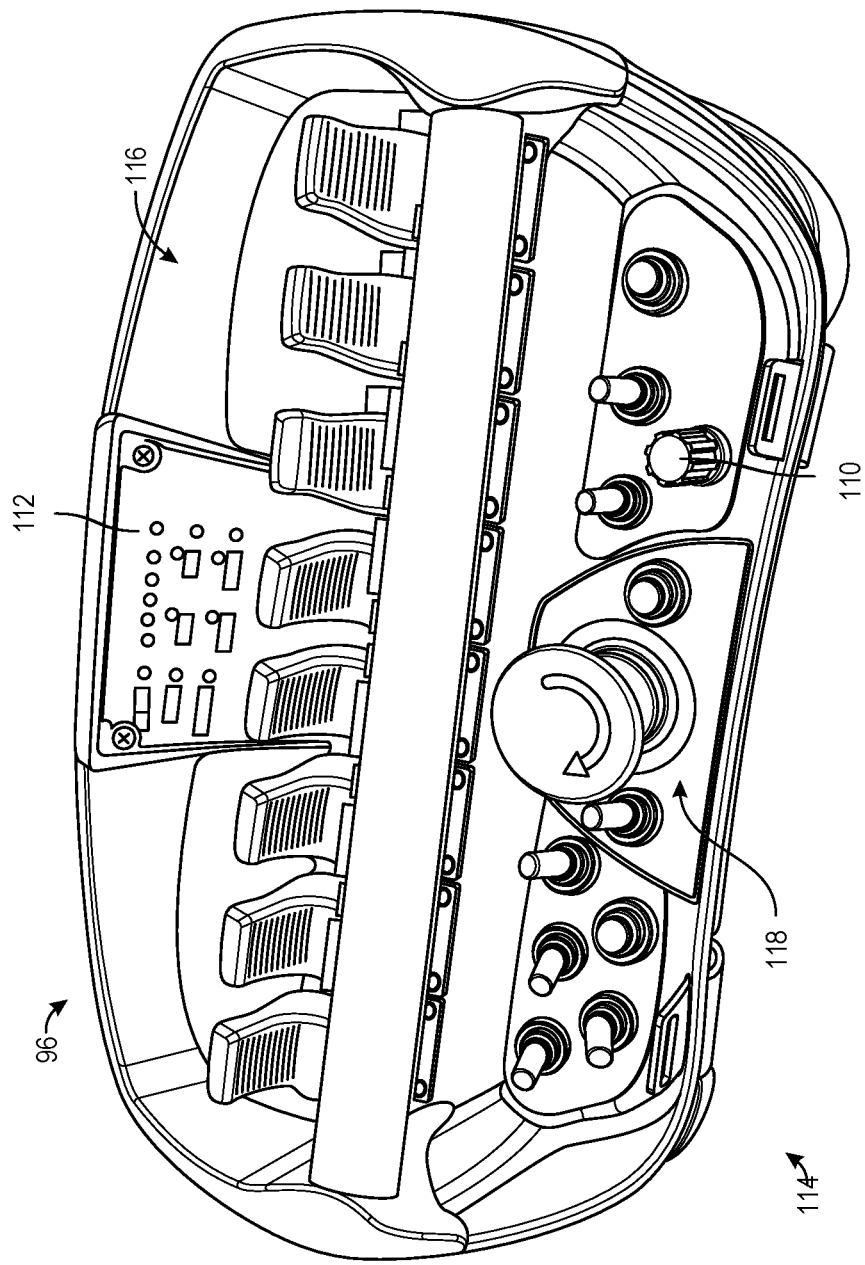
Figure 7:
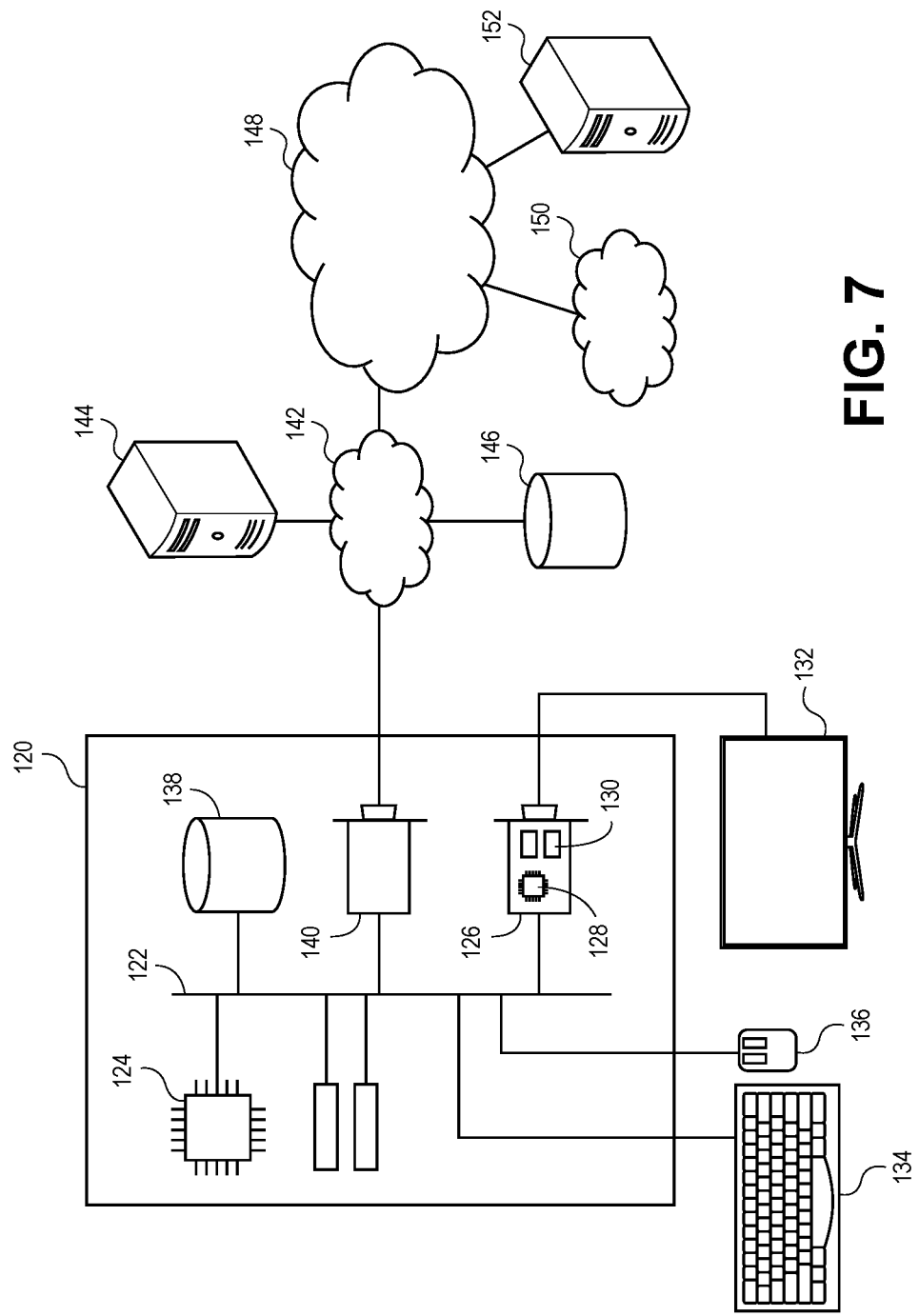
Figure 8:
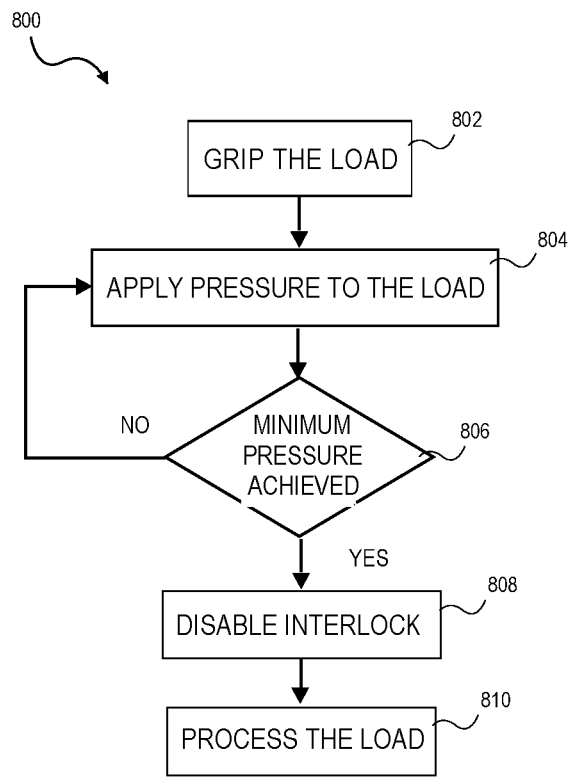
Figure 9:
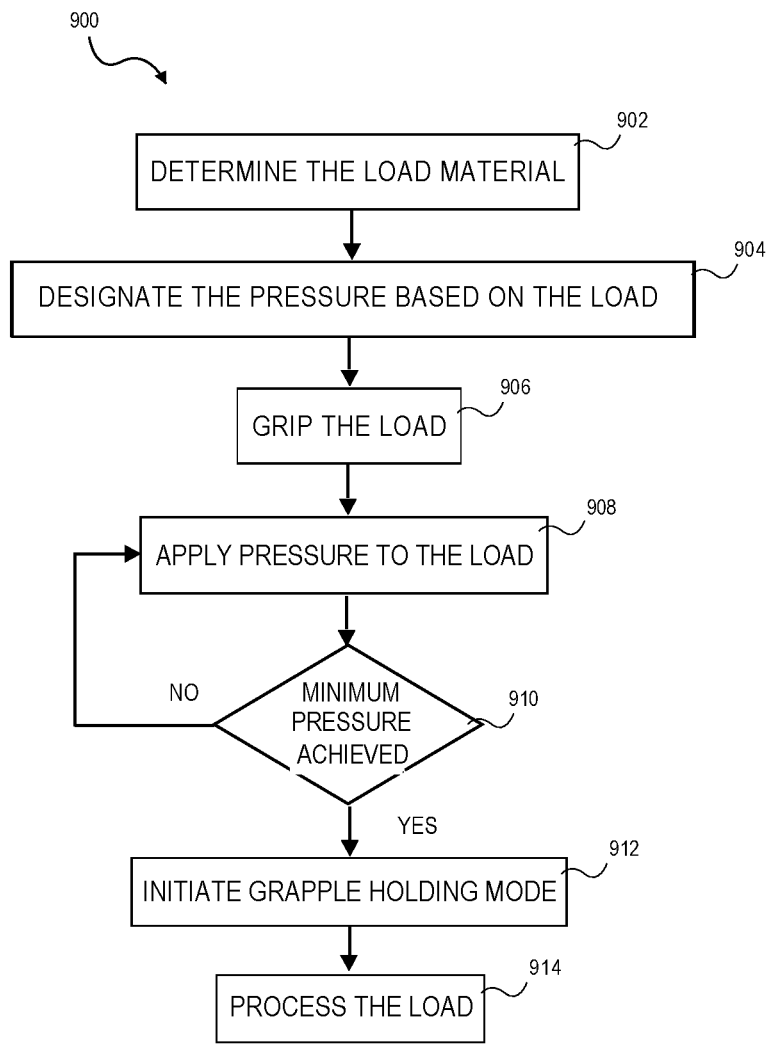
Figure 10:
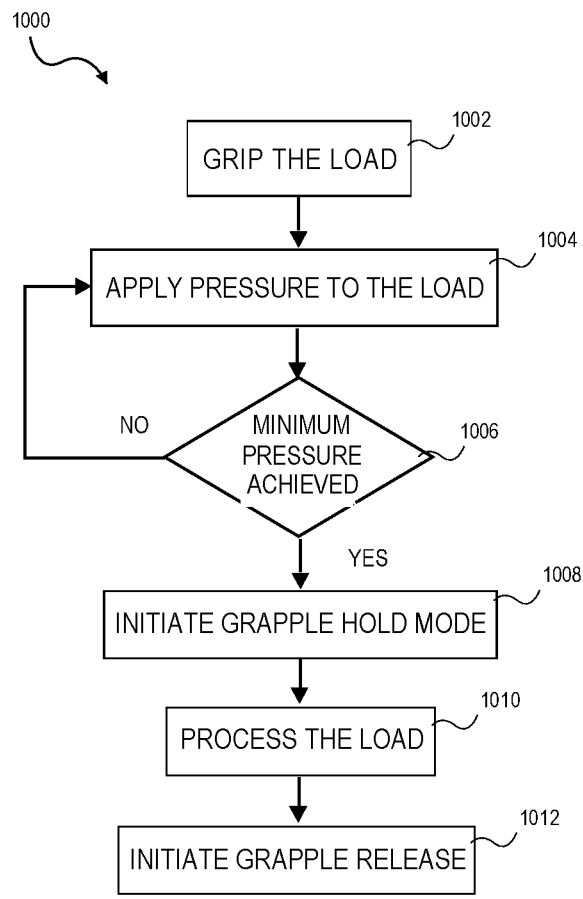

FIGS. 4A-C depict closeup views of the felling grapple for certain embodiments of the invention;

FIG. 5 depicts a schematic of a grapple control system including a hydraulic and an electrical system for controlling the grapple in embodiments of the invention;

FIG. 6 depicts an exemplary control interface for operating embodiments of the invention;

FIG. 7 depicts a hardware system for implementing embodiments of the invention;

FIG. 8 depicts a flow chart presenting a method of locking a felling grapple;

FIG. 9 depicts a flow chart presenting a method of varying a grapple pressure; and FIG. 10 depicts a flow chart presenting a method of releasing a load from the grapple.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

Figure 1:
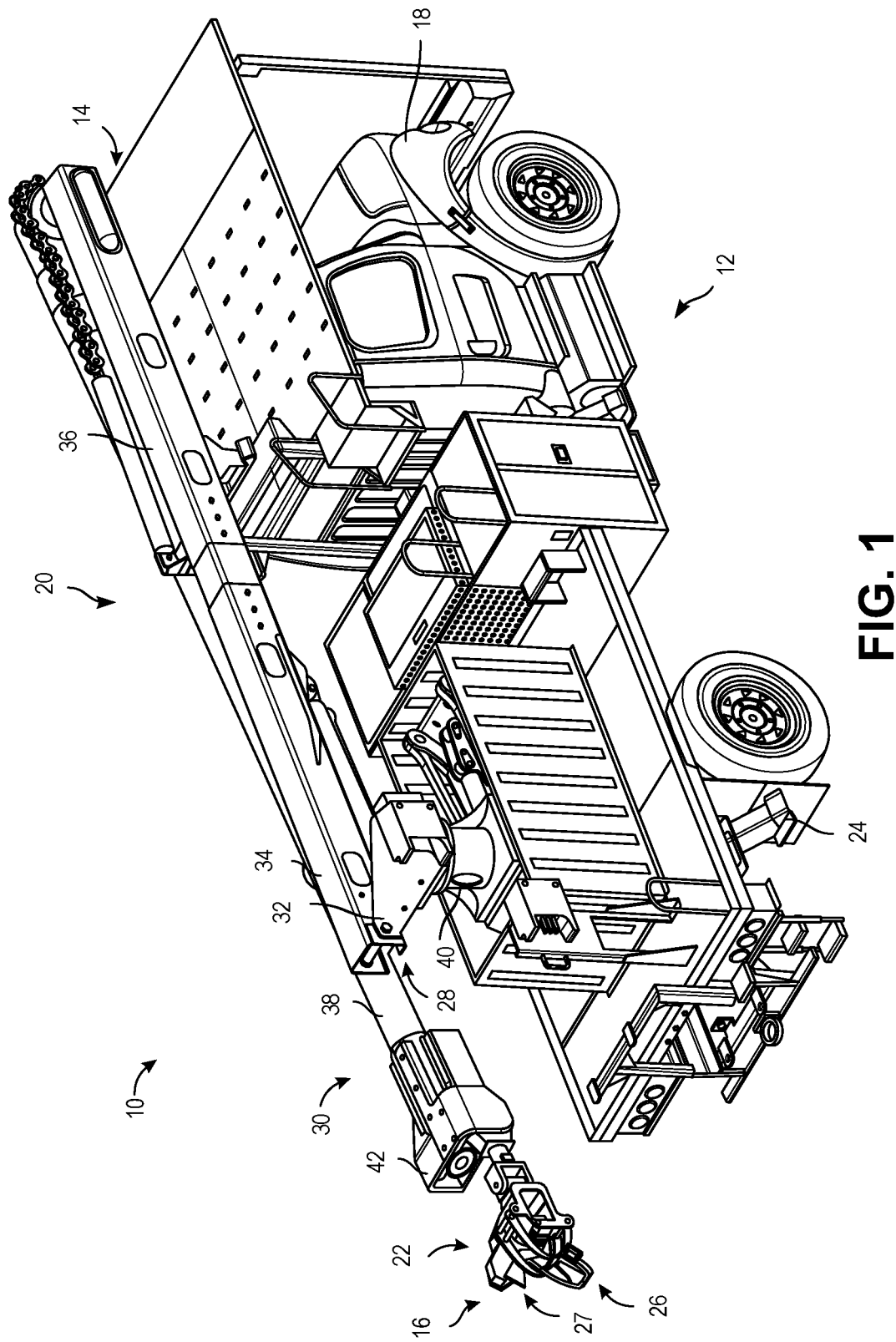
FIG. 1 depicts a perspective view of an embodiments of an utility vehicle with a felling grapple.

An utility vehicle 10, depicted in FIG. 1, presents an exemplary embodiment for practicing the invention. The utility vehicle 10 generally includes a base 12 that supports an extendable member 14 configured to position a tool 16. In an embodiment, a utility truck 18 provides the base 12; a boom assembly 20 serves as the extendable member 14; and a felling grapple 22 serves as the tool 16. The base 12 provides a stable support, which may include outriggers 24, for supporting a load applied to the boom assembly 20 and/or the felling grapple 22. The felling grapple 22 may rotate to alter its orientation for grabbing objects (e.g., a tree limb oriented horizontally or vertically). In some embodiments, the felling grapple 22 comprises grapple 26 for gripping the objects and a feller 27 such as, for example, a saw or shears for cutting the objects.

In certain embodiments, the base 12 is the utility truck 18, but may be a crane base, an oilrig, an earth-working machine, or a fixed structure. In certain embodiments, the utility vehicle 10 is used to access elevated objects or otherwise difficult to reach items. For example, the utility vehicle 10 may include the boom assembly 20 that is rotatable and extendable. The boom assembly 20 is used to extend the reach of the tool for accessing difficult to reach locations. The base 12 is mechanically coupled to a proximal end 28 of the boom assembly 20 and the tool 16 is mechanically coupled to a distal end 30 of the boom assembly 20, opposite the proximal end. In an embodiment, the tool 16 is the felling grapple 22 configured to grab objects such as tree limbs (for cutting) or telephone poles (for placing upright in a hole in the ground). FIGS. 4A-C depict exemplary grapples, as further described below.

The boom assembly 20 is mechanically coupled to the felling grapple 22 and configured to support the felling grapple 22. For extending the reach of the felling grapple 22, the boom assembly 20 may include more than one section. For example, proximal to the base 12 is a rotatable arm 32, followed by a lower member 34, middle member 36, and an upper member 38. The felling grapple 22 is located at the distal end 30 (with respect to the mobile base 12) of the boom assembly 20. The rotatable arm 32 is mechanically coupled to a rotatable shaft 40 mechanically coupled to the base 12. The lower member 34 may pivot from the end of the rotatable arm 32, and the upper member 38 may pivot from an upper end of the middle member 36.

Additionally members may extend from other members or members may be telescopic. For example, the middle member 36 may be, at least in part, disposed within the lower member 34, and capable of moving longitudinally within the lower member 34, to extend or retract by telescoping. The boom assembly 20 may include fewer or a greater number of sections, or members, without departing from the scope hereof.

In certain embodiments, the upper member 38 is electrically insulated to enable operation to nearby electrical power lines. An insulated member 42 may be formed of a non-conductive material, such as a polymer. The boom assembly 20, depicted in an alternative embodiment in FIG. 2, may fold into a collapsed position which enables transporting via the base 12 as shown, or may extend as depicted in the exemplary embodiment presented in FIG. 3.

In some embodiments, the felling grapple 22 is configured for holding tree limbs while they are being cut. Operation of the felling grapple 22 may be by remote control for reducing the likelihood of an electrical discharge through the operator. The felling grapple 22 may be equipped with, or used in conjunction with, a feller 27 such as, for example shears or a saw, such that the felling grapple 22 grips the tree limb to be cut, the cutting shears cut the limb, and the felling grapple 22 maintains its grip on the limb to lower it to the ground via the boom assembly 20. As the limb is cut, its weight is transferred from the tree to the felling grapple 22, and this load (e.g., the weight of the limb) is applied to the boom assembly 20 and in turn the base 12.

The felling grapple 22 may be placed in proximity to the object (e.g., a tree limb). Prior to extending the boom assembly 20, the base 12 may be moved to an appropriate location and stabilized. The boom assembly 20 may be rotated about the rotational shaft, and extended upwards and outwards away from the base 12 by pivoting the lower member 34, the middle member 36, the upper member 38, and by extending the middle member 36. Various combinations of these movements may be employed, together with rotating the felling grapple 22, to position the felling grapple 22 for gripping the object.

Figure 2:
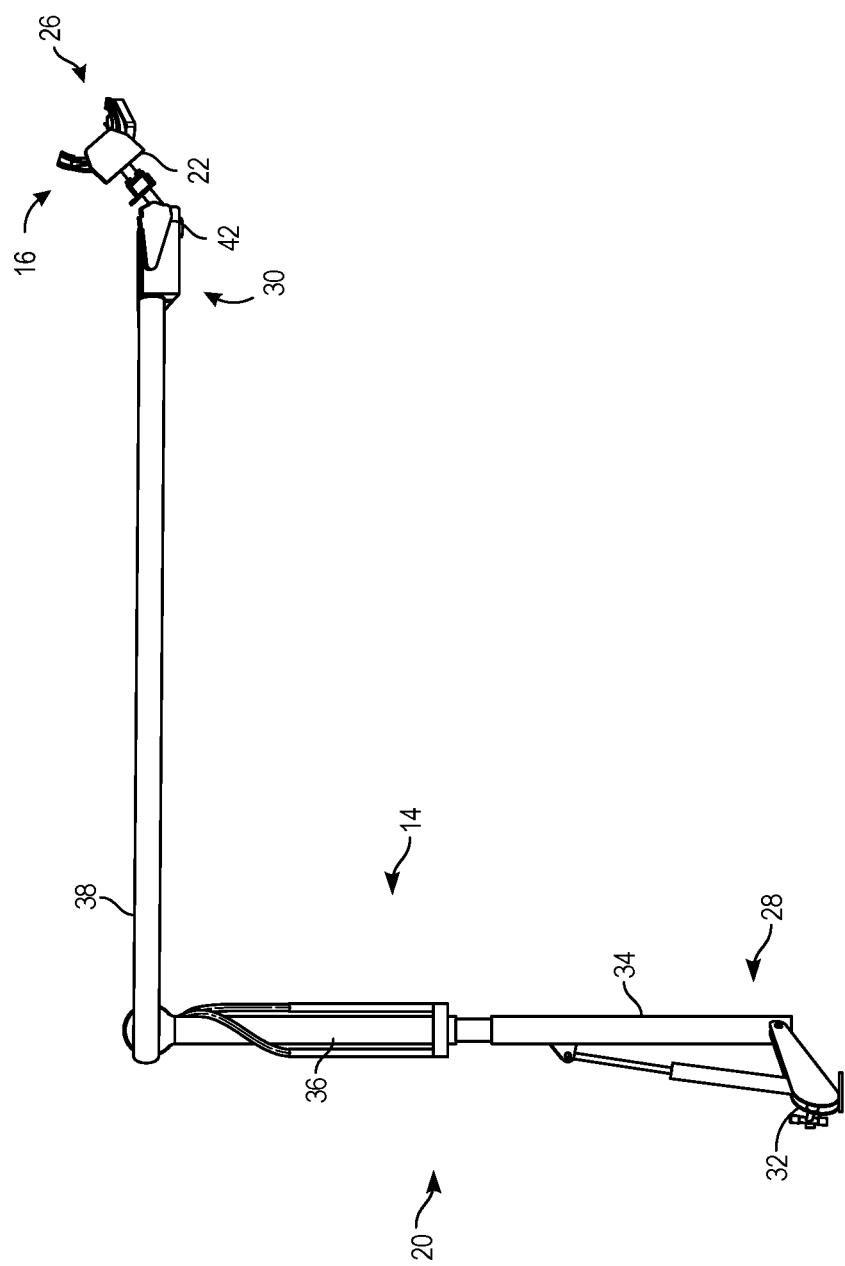
FIG. 2 depicts a perspective view of an embodiment of a boom with a felling grapple.

FIG. 2 depicts an embodiment of the boom assembly 20 extended for use. The boom assembly of FIG. 2 presents the boom assembly 20 and boom assembly 20 components as described in FIG. 1. The boom assembly 20 may be extended such that the upper member 38 is rotatably extended from the middle member 36 and the lower member 34. Further, in some embodiments, the middle member 36 may telescopically extend from the lower member 34. The boom assembly 20, depicted in FIG. 2, in some embodiments, may be used together with the utility vehicle 10 depicted in FIG. 1 as described above.

Figure 3:
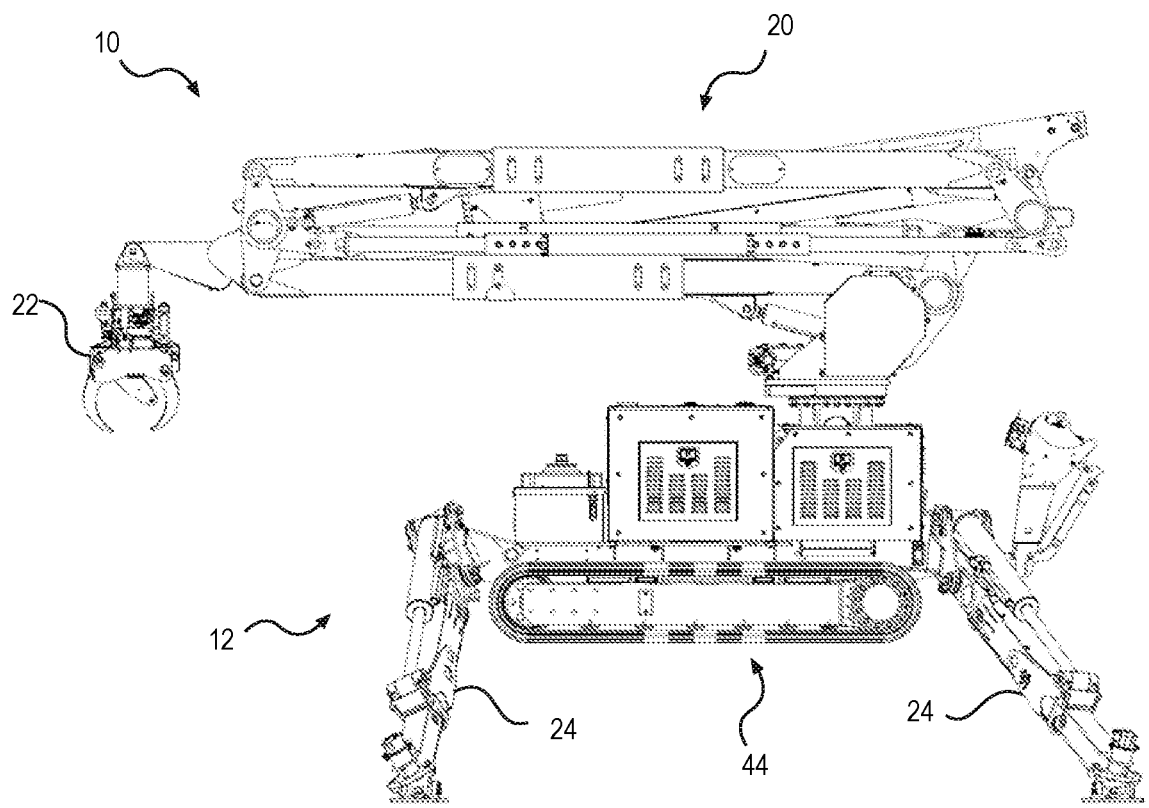
FIG. 3 depicts an alternative embodiment of the utility vehicle depicted in FIG. 1.

FIG. 3 presents an embodiment of the utility vehicle 10 described above. In some embodiments, the base 12 may comprise a mobile track device 44 as shown, or be the utility truck 18, a crane base, an oilrig, an earth-working machine, or a fixed structure. The outriggers 24 may be extendable, retractable, removable, and may be manually attached and extended or may be connected to the hydraulic or electrical system of the utility vehicle 10. The boom assembly 20 may be retractable and, in some embodiments, may fold as shown for storage and transport. The felling grapple 22 may also be removed for transport or may be secured at the end of the boom assembly 20. The utility vehicle 10 may be self-propelled with wheels or with tracks as shown or may be loaded onto a trailer and transported by a separate vehicle.

Turning now to an embodiment depicted in FIGS. 4A-C, the exemplary felling grapple 22 including the grapple 26 may be placed about the load (e.g., around a tree limb). The grapple 26 may spread apart to accommodate the tree limb, then close around the tree limb to grip it. The grapple 26 may lightly grip the tree limb without transferring any substantial weight to the felling grapple 22 or the grapple 26 may supply a necessary amount of pressure to hold the load in a desired position without otherwise breaking or damaging the load.

FIGS. 4A-C depict an embodiment of the invention presenting the felling grapple 22 attached to the boom assembly 20 via a positioning system 46 and a boom tip cover 48. The positioning system 46 comprises a yaw actuator 50, a roll actuator 52, and a pitch actuator 54. Some or all of the pitch actuator 54 may be housed in the boom tip cover 48 at the distal end 30 of the boom assembly 20.

In some embodiments, the boom tip cover 48 may be non-structural and designed to provide electrical and mechanical insulation. The boom tip cover 48 may be designed to be resistant to impact and electrical current. The boom tip cover 48 may cover all boom tip components or may only partially cover some components. In some embodiments, the boom tip cover 48 may be non-structural and bend, deform, and deflect upon load, without failure to protect the enclosed components. The boom tip cover 48 may house oil reservoirs and hose routings for the hydraulic system providing energy to the felling grapple 22, feller 27, and boom assembly 20. Further, the boom tip cover 48 may house the pitch actuator 54.

In some embodiments, the felling grapple 22 is configured to pitch along a transverse axis relative to the upper member 38 of the boom assembly 20 provided by the positioning system 46 comprising the pitch actuator 54. The pitch actuator 54 may be a piston (not shown) connected to the boom assembly 20 and to the felling grapple 22. When the piston extends and contracts, the felling grapple 22 pivots about the transverse axis creating a pitching motion. In some embodiments, the pitch actuator 54 may be a rotary actuator similar to the roll actuator 52 and yaw actuator 50 discussed below.

In some embodiments, the positioning system 46 comprises a roll actuator 52. The roll actuator 52 may be a rotary actuator and is attached to the pitch actuator 54 and may relay the pitching motion from the pitch actuator 54 to the felling grapple 22. In some embodiments, the roll actuator 52 is attached directly to the pitch actuator 54. The roll actuator 52 may rotate about a longitudinal axis substantially parallel to the boom assembly 20 distal end 30 and 90 degrees to the pitch actuator 54. The roll actuator 52 may provide 360 degrees of rotation to the felling grapple 22.

In some embodiments, the positioning system 46 comprises a yaw actuator 50. The yaw actuator 50 may be a rotary actuator similar to the roll actuator 54 and may provide, for example, 180 degrees of rotation. The yaw actuator 50 may be attached to a u-frame 60 that attaches the yaw actuator 50 to the roll actuator 52. In some embodiments, the yaw actuator 50 may be directly attached to the felling grapple 22 and in some embodiments intermediate components may attach the yaw actuator 50 to the felling grapple 22. The yaw actuator 50 may provide rotation about an axis that may be 90 degrees to the roll actuator 52 axis of rotation and 90 degrees to the pitch actuator 54 axis of rotation. In some embodiments, the roll actuator 52, yaw actuator 50, and pitch actuator 54 may be in different arrangements such that for example, the yaw actuator 50 or the roll actuator 54 is attached directly to the boom assembly 20 and the roll actuator 52 or the pitch actuator 54 is attached to the felling grapple 22.

In some embodiments, as depicted in FIGS. 4A-C, the felling grapple 22 may comprise upper tines 62 and lower tines 64 for securing the load. Because the felling grapple 22 rotates, upper and lower are relative terms and used in reference to the figures and as such upper may be lower and lower upper spatially in some embodiments.

The felling grapple 22 may rotate, as described above, to any angle necessary to properly grip the load. For example, the load may be a fallen tree branch that rests on power lines. In order to grip the load, the felling grapple 22 may rotate by pitch, roll, and yaw to align with the branch, and remain out of the way of the power lines. This may ensure that only the branch is contacted by the felling grapple 22 and the felling grapple 22 remains a minimum desired distance from the power lines.

The felling grapple 22 may include a housing 66 that protects interior components from damage from loose tree limbs and electricity. The housing 66 may be any durable material that may be rated and tested to withstand loads similar to those used in tree trimming such as branches falling, moving the boom such that the felling grapple 22 impacts a tree or structure or any other possible error that may cause damage to the interior components. Further, the housing 66 may be electrically insulated using polymer as described above. In some embodiments, the felling grapple 22 housing 66 comprises the same or similar material to the boom tip cover 48.

In some embodiments, the upper tines 62 and lower tines 64, when separated, present a general Y-shape. Similarly, the feller housing 68 presents a Y-shape. The Y-shape aids in aligning the felling grapple 22 with the load such as, for example, a limb. As the felling grapple 22 move towards the limb, the Y-shaped feller housing 68 contacts the limb directing the limb to the vertex of the Y-shape. This configuration provides a location for cutting the limb. Once the limb is secured in the vertex the feller 27 may be used to cut the limb. Further, when free cutting, the feller 27 may cut limbs while using the Y-shaped feller housing 68 as a backing.

The feller housing 68 may also be connected to a guard 70. The guard 70 may provide a housing to prevent damage to the feller 27 or components for operating the feller 27. The guard 70 may also provide protection for any workers that may be working in close proximity to the felling grapple 22.

In some embodiments, the upper tines 62 and the lower tines 64 open and close together with one action. This action, and force, may be relayed to the grapple 26 from a single hydraulic grapple cylinder (not shown). The operation of one grapple cylinder for both the upper tines 62 and lower tines 64 ensures that the upper tines 62 and lower tines 64 work together substantially simultaneously and reduces the weight of the system attached to the boom assembly 20 by only using one cylinder. Typically, the grapple 26 comprises a pair of tines (shown as 62 and 64). The grapple 26 is operated by one designated cylinder thus have a cylinder per set of tines. In typical felling grapples, the upper tines 62 would have a designated cylinder and the lower tines 64 would have a designated cylinder. Therefore, typically, general felling grapples would have two cylinders. The felling grapple 22 presented in embodiments herein, has a weight advantage over typical grapples since only one cylinder is necessary.

The felling grapple 22 may clamp the load between the upper tines 62 and the lower tines 64. The upper tines 62 may rotate about an upper linking element 72 and the lower tines 64 may rotate about a lower linking element 74 causing the tines 62,64 to rotate together clamping and securing the load. In some embodiments, the upper linking element 72 and the lower linking element 74 may be pins as depicted in FIGS. 3A-C. The tines 62/64 may rotate about the linking elements applying pressure to the load for gripping and securing the load between the tines 62/64. The pressure applied to the load may be proportional to the pressure in a hydraulic system providing energy to the tines 62/64. The pressure applied to the load may also be controlled manually by the operator or automatically by a control system.

Generally, the hydraulic system includes a motor, valves, manual controls, and hydraulic lines, and, in some embodiments, is connected to an electrical system for controlling portions of the hydraulic system. The hydraulic fluid may be any mineral oils, fire resistant fluids, water based fluids, or any fluid that may be used for hydraulic purposes. The hydraulic fluid may be pumped from a pump at the base or any hydraulic motor or tool that may couple to the hydraulic system at any access point that may be on the utility vehicle 10. In some embodiments presented herein, the felling grapple 22 and feller 27 connect to the hydraulic system via couplers (not shown) at the distal end of the boom assembly 20. The hydraulic fluid may be provided to the felling grapple 22 via hydraulic lines and the fluid may be controlled via control valves. In some embodiments, the hydraulic fluid may be controlled by valves that are electrically controlled by an automatic control system, an electrical interface, manually, or via remote control.

Turning now to an embodiment of the hydraulic system 76 and the electrical system 78 as depicted by a schematic of an embodiment of a felling grapple 22 in FIG. 5, the hydraulic lines 80 comprise a saw motor line 82, a saw extend line 84, a saw retract line 86, a grapple open line 88, and a grapple close line 90. The hydraulic lines 80 extend from a turntable valve system 92 to the grapple. The turntable valve system 92 may be located at the base 12, at the distal end 30 of the boom assembly 20 on an aerial platform (not shown), or at any location on the utility vehicle 10. The turntable valve system 92 may be electrically connected to a controller 94 and a radio controller 96 by electrical lines 98. The controller 94 may automatically control valves associated with the turntable valve system 92 to open and close based on sensor readings. The radio controller 96 may be a human interface system that allows an operator to control the turntable valve system 92 either by wire or wirelessly. A sensor 100, such as a pressure transducer 102, may be connected to the grapple close line 90 and to the controller 94 sending a signal indicative of a pressure in the grapple close line 90 to the controller 94. A manual release valve 104 may be connected to the grapple close line 90 by release line 106 allowing a person to manually release the pressure in the grapple close line 90 in the event of a malfunction. All valves on the turntable valve system 92 may be controlled manually by hand operation or electrically by signals from the controller 94 and/or signals from the radio controller 96.

In some embodiments, three hydraulic lines provide energy to the feller 27, in this embodiment, the saw 108; the saw motor line 82, the saw extend line 84, and the saw retract line 86. The saw motor line 82 provides hydraulic fluid through the saw motor allowing the saw 108 to cut. If the saw 108 is a chain saw this action enables rotation of the chain such that the blades of the chain cut the load. This may be provided by opening and closing a valve on the turntable valve system 92.

The saw extend line 84 enables the saw 108 to extend for cutting. Hydraulic fluid may be provided in the saw extend line 84. When pressure is applied, the saw 108 extends from a stored position to cut the load. Hydraulic fluid may also be provided in the saw retract line 86. When pressure is supplied in the saw retract line 86, the saw 108 retracts back to the stored position. In some embodiments, the saw 108 may be shears or any other cutting device. Hydraulic lines may be provided for each tine 62/64 in the shears controlled by one grapple cylinder providing the mechanical motion or both tines or shears may be controlled by one grapple cylinder that both tines are connected to. In any event, any operation of mechanical motion provided by the hydraulic system may either be a function of a hydraulic motor or hydraulic grapple cylinders containing pistons providing motion under pressure from the hydraulic fluid to any cutting device.

In some embodiments, the felling grapple 22 may have at least two hydraulic lines 80; the grapple open line 88, and the grapple close line 90. The grapple open line 88 may open the felling grapple 22 by providing pressurized hydraulic fluid to at least one piston in the grapple cylinder moving the grapple 26 open. The grapple close line 90 may close the felling grapple 22 by a similar method. The grapple 26 of the felling grapple 22 may be opened and closed by the operation of one grapple cylinder. This results in both the upper tines 62 and the lower tines 64 being connected to one grapple cylinder therefore moving substantially simultaneously and at the same rate under the same pressure. This allows the pressure that is applied to the load to be accurately measured and accurately controlled. Further, this configuration saves weight for the felling grapple 22 thus allowing the load to be greater weight. Typically felling grapples comprise a grapple cylinder per tine. The weight savings from comprising only one grapple cylinder for both sets of tines 62/64, allows the load to be of greater weight since the boom assembly 20 and utility vehicle 10 may be rated to lift a specified weight limit and the lack of a cylinder reduces the weight of the felling grapple 22 thus increasing the weight of the load to reach the specified limit.

In some embodiments, the pressure transducer 102 is connected to the grapple close line 90. The pressure transducer 102 converts the pressure from any hydraulic line 80 into an electrical signal. In embodiments described herein, the pressure transducer 102 is connected to the grapple close line 90 and provides a pressure measurement indicative of the pressure in the grapple close line 90 and transmits the electrical signal to the controller 94. The controller 94 may receive the electrical signal and further signal operation of the hydraulic valves on the turntable valve system 92 based on the received electrical signal.

In some exemplary embodiments, the controller 94 may comprise an interlocking function to control the function of the saw 108 or any other cutting device. The operation of the saw 108 may be disabled until a signal is received from the controller allowing the saw motor valve on the turntable valve system 92 to be released and/or controlled. The interlock function may be mechanical or electrical and may disable any operation of the saw 108 such as the saw motor, the saw extension, and the saw retraction. In some embodiments, the saw 108 may be automatically shut off and retracted by the controller 94.

In some embodiments, the interlock disables the power to the saw motor line 82 and the saw extend line 84. The interlock may be integrated into the programming of the controller 94. A lower pressure limit may be set such that the saw motor and saw extend operations are disabled below the lower pressure limit. The pressure in the grapple close line 90 may be sensed by the pressure transducer 102 and a signal indicative of the pressure sent to the controller 94. The controller 94 may initiate the interlock when the signal indicates that the pressure in the grapple close line 90 is below the lower pressure limit. When the indicated pressure is above the lower pressure limit, the controller 94 deactivates the interlock allowing operation of the saw motor and the saw extender, or the feller 27. Any number of pressure thresholds may be used and at any value of pressure. Other operations may also be locked such as grapple open, grapple close, and any saw operations as described. The interlock may also apply to multiple operations and any combination of saw 108 and felling grapple 22 operations.

In some embodiments, when the feller 27 is commanded from the radio controller 96 and the interlock is deactivated, the saw extender may be delayed to allow time for the saw motor to reach operating speed. The delay may be set to a specified time based on the time to accelerate to operating speed or a sensor, such as, for example, a hall effect sensor, and controller may be used to detect when the saw is at operational speed. The saw extender may only be operational in specified range of operating speeds.

In some embodiments, the sensor 100, or pressure transducer 102, in fluid communication with the grapple close line 90, may be used to detect the grapple close line 90 pressure and allow the operator to variably adjust the pressure applied to the load. Different materials may require less pressure than other materials. For example, pine may require less pressure than oak. High pressure may grip tightly and be good for oak while the same amount of pressure may damage pine. Further, some material, or wood, may be rotten and therefore soft. If high pressure is used the wood may crumble or break resulting in wood pieces falling. In these situations it may be useful to vary the pressure applied to the material such that the material does not break or fall.

In some embodiments, the operator may adjust the load by applying pressure directly through the turntable valve system 92 or by using the radio controller 96 as depicted in some embodiments in FIG. 6. The operator may adjust the variable pressure knob 110, adjusting the pressure that may be applied to the load. The pressure transducer 102 may indicate the pressure in the grapple close line 90 to the controller 94 and the controller 94 may directly control the pressure to the designated value by controlling the valves on the turntable valve system 92. An indication may also be sent to the operator via an indicator display 112 on the radio controller 96. The indicator display 112 may be any heads-up display or an indicator such as an LED that illuminates or a sound may indicate when the grapple close line 90 pressure reaches the controlled pressure. In some embodiments the variable pressure control is a dial, pushbutton, or slide control knob.

In some embodiments the variable pressure is preset based on the material to be gripped and cut. In some embodiments, and pressure level for the material may be displayed while in other embodiments a database may store optimal pressures for different materials and the material may be selected from a menu. Upon selection of the material the controller may automatically set the grip pressure for the load. As the pressure is applied, the pressure transducer 102 sends the signal indicative of the pressure to the controller 94 and the pressure is controlled to the designated value.

In some embodiments, the load should be held in place at a constant pressure to avoid dropping the load or shifting of the load in the grapple 26. In some embodiments, this operation is called "grapple holding mode." In some embodiments, and in typical systems, a main control valve providing hydraulic fluid to the grapple cylinders providing pressure to the grapple 26 is closed trapping the hydraulic fluid in the grapple close line between the grapple cylinder and the main control valve. This traps the fluid, and the pressure, in the line and provides substantially constant pressure to the tines thus "holding" the load. In this configuration, the pressure is not adaptable to changing conditions. For example, a shift in the load to a smaller diameter position on the load may result in the less pressure applied to the load. This occurs because no more fluid is added through the main control valve thus the tines do not shift with the load. The load may shift or, in some cases, drop from the felling grapple 22. Further, a shift in the load may cause damage to the grapple close line 90, main control valve, couplers, or any other part of the felling grapple 22. Since the hydraulic fluid is trapped in the grapple close line 90 there is nowhere for the energy to go. If pressure is applied to the tines 62/64, the force is applied in the grapple close line 90 which may cause a blowout of the grapple close line 90 or damage to other parts of the felling grapple 22.

In order to solve this problem, in some embodiments, the main control valve, provided in some embodiments at the turntable valve system 92, is left open and a constant pressure is supplied to the grapple close line 90 and the grapple cylinder. The constant pressure may be controlled by the controller 94 connected to the pressure transducer 102 measuring the pressure in the grapple close line 90 and thus controlling the main control valve on the turntable valve system 92 based on the measured pressure. This allows the grapple cylinder, and the grapple 26, to adjust to the shifting load since a constant pressure is maintained on the grapple cylinder, provided in the felling grapple 22, regardless of the shifting load. The grapple 26 may move with the grapple cylinder resulting in a constant pressure being applied to the load even after the load shifts. This configuration reduces the chance that the load may break, fall, or shift while being gripped by the felling grapple 22.

In some embodiments, when the grapple holding mode is initiated and/or maintained an indication of grapple holding mode is relayed to the operator. The indication may be any sensory indication such as a light, sound, or feel indicator. In some embodiments, a light is illuminated on the radio controller 96 for the grapple operator to see and the radio controller 96 may vibrate to signal that the grapple holding mode is initiated. In some embodiments, a sound may indicate the grapple holding mode such as, for example, a voice stating conditions or instructions or auditory alerts may sound.

In some embodiments, the interlocking system controlled by the controller 94 described above is dependent on the grapple holding mode. The interlock may be enabled while the grapple is not in the grapple holding mode and the while the system is in the grapple holding mode the interlock is released and the feller 27 is fully enabled. In some embodiments, the grapple holding mode is a minimum requirement and a secondary requirement may be a minimum pressure in the grapple close line 90. If, for example, the grapple holding mode is initiated and the interlock is disabled but a loss of pressure is sensed by the pressure transducer 102, the controller 94 may automatically disable the feller 27 based on the loss of pressure. This feature may ensure that the feller 27 is disabled during any malfunctions even if the grapple holding mode is enabled. In some embodiments, the operator may override the grapple holding mode via an interface provided on the utility vehicle 10 or on the radio controller 96. The loss of pressure during the grapple holding mode may also be as a result of the manual release mechanism 104 as described below.

When the grapple holding mode is engaged, the load may be cut using the feller 27 and the load may be moved using the boom assembly 20 and the positioning system 46. In some embodiments, all operations of the felling grapple 22 are active when the felling grapple 22 is in grapple holding mode. When the operator activates the felling grapple 22 open then the grapple holding mode is exited and the felling grapple 22 opens and releases the load.

In some embodiments, a manual release mechanism 104, or grapple release valve, is provided with the grapple holding mode. In some embodiments, the felling grapple 22 may positioned beyond the reach of the operator. In the event of a malfunction during the grapple holding mode, the operator may activate a grapple release valve using the manual release mechanism 104. The grapple release valve may be in fluid communication with the grapple close line 90 between the main control valve at the turntable valve system 92 and the grapple cylinder. In some embodiments, the grapple release valve is the manual release mechanism 104. The grapple release valve may direct the hydraulic fluid from the grapple close line 90 to an auxiliary tank. This releases the pressure in the grapple close line 90 allowing the felling grapple 22 to release the load. In some embodiments the grapple release valve may be positioned at, or near, the main control valve at the turntable valve system 92 on the base 12. This allows the operator to access the grapple release valve while the felling grapple 22 is out of reach.

The optional radio controller 96 may provide a remote interface for the operator as best depicted in FIG. 6. In some embodiments, the radio controller 96 provides a lower control panel 114 and an upper control panel 116 providing controls for the boom assembly 20, the base 12, and the felling grapple 22. The controls provided may control operations for any part on the utility vehicle 10. The radio controller 96 may also provide an indicator panel 112 that provides operational conditions to the operator.

In some embodiments, upper control panel 116 and lower control panel 114 provide an interface comprising switches, knobs, buttons, levers, touchscreens, microphones, cameras, mouse pads, touch pads, or any other method of receiving input from the operator. The upper control panel 116 and lower control panel 114 may receive input from the operator and control any operation on the utility vehicle 10 including the boom assembly 20, the felling grapple 22, and the hydraulic system 76 and the electrical system 78 including any valves, and electrical, hydraulic, pneumatic, and/or mechanical devices. In some embodiments, the upper control panel 116 and the lower control panel 114 may comprise an emergency shutoff 118 that may shut off all operations of the utility vehicle 10, the boom assembly, or the felling grapple 22. In some embodiments the emergency shutoff 118 may be connected to the manual release mechanism 104.

In some embodiments the emergency shut off 118 may be limited to designated operations such as the felling grapple 22 or just the boom assembly 20. The operation of the emergency shut off 118 may be programmed in the radio controller 96 or at an interface on the utility vehicle 10.

In some embodiments, the upper control panel 116 and the lower control panel 114 may provide the variable pressure knob 110 for controlling the variable pressure to the felling grapple 22. The variable pressure knob 110 may provide levels such as low, medium, and high, or may provide number ranges such as 1-10 or 1-100. The variable pressure knob 110 may also provide settings for different types of material. For example, the variable pressure knob 110 may feature different types of wood such as soft (e.g. pine) and hard (e.g. oak). In some embodiments, the variable pressure knob 110 may be a slide dial, push button, or any other device that may set the pressure level.

In some embodiments, the indicator panel 112 may have lights, screens, microphones, motors, or any other device that may be used to provide visual, audible, or tactile information. The indicator panel 112 may provide indications of the condition of the utility vehicle 10 such as motors running, the load information, felling grapple 22 information, pressures, power levels, and any safety information such as operator proximity or pedestrian or structure proximity to the utility vehicle 10 and the felling grapple 22. The configuration depicted in FIG. 6 is exemplary only and the upper control panel 116 and the lower control panel 114 may be left and right and the indicators and controls may be at any location on the radio controller 96.

In an embodiment, radio controller 96 includes a handheld control stick (e.g., a joystick or sidestick controller) for positioning components of the utility vehicle 10 (e.g., the boom assembly). In some embodiments, the radio controller 96 is connected by a wire and sends electrical signals indicative of the operator inputs to the utility vehicle 10 over the wire. In some embodiments, the radio controller 96 is connected to the utility vehicle 10 such as at the base 12 or in an aerial platform (not shown) providing a platform for the operator to stand in and be elevated by the boom assembly 20. In some embodiments, the radio controller 96 communicates with the utility vehicle 10 by radio frequency, infrared, satellite, close proximity communication such as WIFI or BLUETOOTH, or any other method of remote or connected communication.

Turning first to FIG. 7, an exemplary hardware platform for implementing the control and the interface for certain embodiments of the invention is depicted. Computer 120 can be the radio controller 96, a desktop computer, a laptop computer, a server computer, a mobile device such as a smartphone or tablet, or any other form factor of general- or special-purpose computing device, usable for remotely or wire controlling the equipment as discussed above. In other embodiments, computer 120 takes the form of an embedded controller and may omit the traditional peripherals depicted and described below in favor of dedicated input controls and outputs for operating the equipment. Depicted with computer 120 are several components, for illustrative purposes. In some embodiments, certain components may be arranged differently or absent. Additional components may also be present. Included in computer 120 is system bus 122, whereby other components of computer 120 can communicate with each other. In certain embodiments, there may be multiple busses or components may communicate with each other directly. Connected to system bus 122 is central processing unit (CPU) 124. Also attached to system bus 122 are one or more random-access memory (RAM) modules. Also attached to system bus 122 is graphics card 126. In some embodiments, graphics card 126 may not be a physically separate card, but rather may be integrated into the motherboard or the CPU 124. In some embodiments, graphics card 126 has a separate graphics-processing unit (GPU) 128, which can be used for graphics processing or for general purpose computing (GPGPU). Also on graphics card 126 is GPU memory 130. Connected (directly or indirectly) to graphics card 126 is display 132 for operator interaction. In some embodiments no display is present, while in others it is integrated into computer 120. Similarly, peripherals such as keyboard 134 and mouse 136 are connected to system bus 122. Like display 132, these peripherals may be integrated into computer 120 or absent. Also connected to system bus 122 is local storage 138, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 140 is also attached to system bus 122 and allows computer 120 to communicate over a network such as network 142. NIC 140 can be any form of network interface known in the art, such as Ethernet, ATM, fiber, Bluetooth, or Wi-Fi (i.e., the IEEE 802.11 family of standards). In vehicular embodiments, a controller area network (CAN) and/or the RS-485 (also known as TIA-485 or TIA-485-A) standard can be used for communication between components. NIC 140 connects computer 120 to local network 142, which may also include one or more other computers, such as computer 144, and network storage, such as data store 146. Generally, a data store such as data store 146 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 144, accessible on a local network such as local network 142, or remotely accessible over Internet 148. Local network 142 is in turn connected to Internet 148, which connects many networks such as local network 142, remote network 150 or directly attached computers such as computer 152. In some embodiments, computer 120 can itself be directly connected to Internet 148.

In some embodiments, computer 120 is directly connected to and controls equipment as discussed above. In other embodiments, computer 120 communicates via network 142 or Internet 148 with another computer (such as computer 144 or computer 152) that controls the equipment. In still other embodiments, computer 120 controls (directly or indirectly) simulated equipment (for example, for the purpose of training an equipment operator). In some embodiments, the computer 120 is connected to the radio controller 96 and/or the controller 94 by the electrical system 78. The computer 120 may also control the hydraulic system 76 by controlling valves on the turntable valve system 92.

FIG. 8 depicts an exemplary method generally referenced by number 800 for implementing the interlocking system of the felling grapple 22 described above. In a Step 802, the operator controls the felling grapple 22 to grip a load. The operator may use an interface on the utility vehicle 10 or remote and in wired or wireless communication. A receiver on the utility vehicle 10 at the controller 94 may receive the communication from the operator and signal the felling grapple 22 for operation. The hydraulic system 76 may then be initiated by the electrical system 78 applying pressure to the grapple cylinder causing the grapple 26 to grip the load.

In a Step 804, pressure is applied to the load until a grapple holding mode is reached. The pressure is applied through the hydraulic system 76 and the pressure in the grapple close line 90 is measured by the pressure transducer 102. Once the designated amount of pressure is achieved the pressure is held constant by the hydraulic system 76 and a signal is sent to the operator indicating the grapple holding mode is enabled.

In a Step 806, the controller determines if the pressure is above a minimum threshold. If the pressure is below the minimum threshold the method returns to Step 804. If the pressure is above the minimum threshold the method moves to Step 808.

In a Step 808, upon determining that the pressure is above the minimum threshold, the controller 94 disables the interlock allowing the operator to access and operate features of the feller 27 and the load that may then be processed. In some embodiments, the operator may activate the saw motor and the saw extend function enabling the operator to perform cutting actions. In some embodiments, if the pressure drops below the minimum threshold while in operation the feller 27 is automatically disabled and/or automatically retracted and stowed. The access may be accompanied by an indication that the feller 27 is active.

In a Step 810 the load is processed. The load may then be cut and processed in the manner in which is desired. The load may be removed and placed in a different location by the utility vehicle 10.

FIG. 9 depicts an exemplary method generally referenced by number 900 for implementing the variable pressure system of the felling grapple 22 described above. In a Step 902, the material of the load is determined. The material may be, for example, a soft wood such as pine or cedar, or may be a hardwood such as oak or hickory. These different woods, with different densities, weights, and strengths, may require different pressures.

In a Step 904, the pressure is designated for the material. The pressure may be set by an experienced operator or the operator may input the type of material and the pressure is set automatically. In some embodiments, sensors detect the hardness of the material upon applying pressure and the pressure is automatically adjusted based on the detection.

In a Step 906, the operator moves the grapple into position and grips the load. As the load is gripped, the pressure applied to the load may be sensed by the pressure transducer 102 as described above.

In a Step 908, pressure is applied to the load. The pressure transducer 102 measures the pressure in the grapple close line 90, indicative of the pressure applied to the load, and sends a signal indicative of the pressure to the controller 94. The pressure transducer 102 may be connected to the grapple close line 90, or may be a pressure sensor on the grapple 26 or tines 62/64 or at any part of the felling grapple 22 that allows the sensor to collect information indicative of the pressure or a force applied to the load.

In a Step 910, the controller determines if the pressure is above a minimum threshold or at the designated pressure. If the pressure is below the minimum threshold or designated pressure the method returns to Step 908. If the pressure is above the minimum threshold the method moves to Step 912.

In a Step 912, the designated pressure is reached and the controller 94 commands a constant pressure as described in the grapple holding mode above. In some embodiments, when the designated pressure is achieved, the pressure transducer 102 sends a signal indicative of the pressure to the controller 94 and the controller initiates grapple holding mode. In the grapple holding mode, a constant pressure may be applied to the grapple cylinder by closing the main control valve on the turntable valve system 92 or by leaving the main control valve open and supplying the hydraulic fluid in the grapple close line 90 at the specified pressure.

In a Step 914, the load is processed. The load may then be cut and processed in the manner in which is desired. The load may be removed and placed in a different location.

FIG. 10 depicts an exemplary method generally referenced by number 1000 for implementing the grapple holding system and release of the felling grapple 22 described above. In a Step 1002, the operator controls the felling grapple 22 to grip a load. The operator may control the felling grapple 22 to grip the load as described in embodiments presented above.

In a Step 1004, the felling grapple 22 applies pressure to the load. The pressure is applied through the hydraulic system 76 and the pressure in the grapple close line 90 is measured by the pressure transducer 102 as described in embodiments above.

In a Step 1006, the controller determines if a pressure threshold is met. If the pressure threshold is not met the method returns to Step 1004. If the pressure threshold is met the method continues to Step 1008.

In a Step 1008, upon determination that the pressure threshold is met, the felling grapple 22 initiates the grapple holding mode. In the grapple holding mode a constant pressure may be applied to the grapple cylinder by closing the main control valve or by leaving the main control valve open and supplying the hydraulic fluid in the grapple close line 90 at the specified pressure. The grapple holding mode is described in more detail in embodiments presented above.

In a Step 1010, the load is processed. The operator may then cut the load using the cutting tool and move the load using the grapple and boom assembly.

In a Step 1012, in the event of a malfunction, when the felling grapple 22 is out of the reach of the operator, the operator may initiate the grapple release mechanism 104. The grapple release mechanism, in some embodiments, may be a release valve that is accessible at the base 12 or any other ground level location. The release valve, when activated, may direct the hydraulic fluid from the grapple close line 90 to the auxiliary tank. This releases the pressure applied to the grapple cylinder and causes the felling grapple 22 to release the load.

In some embodiments, the steps provided in the methods described above may be omitted or rearranged. Any method that may be performed using any systems as described herein may be added to the methods described above.

Although embodiments of this disclosure have been described with reference to the illustrations in the attached drawing figures, it is noted that equivalents may be employed and substitutions made herein without departing from the scope hereof as recited in the claims.

Having thus described various embodiments, what is claimed as new and desired to be protected by Letters Patent includes the following:

1. A felling grapple for gripping a load comprising:
 a grapple comprising a first tine and a second tine for gripping the load;
 a feller configured to cut the load;
 one hydraulic cylinder configured to move the first tine and the second tine; and
 a sensor configured to measure a pressure indicative of a pressure applied to the load by the first tine and the second tine gripping the load,
 wherein the pressure is measured in a grapple close line,
 wherein operation of the feller is based at least in part on the sensor measurement,
 wherein at least one operation of the feller is disabled when the pressure measurement drops below a minimum pressure threshold.

2. The felling grapple of claim 1, further comprising:
 a controller for receiving a signal indicative of the pressure measurement,
 wherein the disablement of the at least one operation of the feller is performed by the controller.

3. The felling grapple of claim 2, wherein the operation is a feller motor activation.

4. The felling grapple of claim 3, wherein the feller is a saw, and wherein the controller is further configured to disable extending the saw for cutting.

5. The felling grapple of claim 1, further comprising a valve in fluid communication with the one hydraulic cylinder and operable to supply hydraulic fluid for gripping the load.

6. The felling grapple of claim 5, further comprising a controller for controlling a pressure of the hydraulic fluid supplied based on the measurement from the sensor.

7. The felling grapple of claim 6, wherein a load holding mode is initiated by applying a substantially constant pressure to the one cylinder.

8. The felling grapple of claim 7, wherein the valve is in an open position allowing the one cylinder to move during the load holding mode.

9. A felling grapple for gripping a load comprising:
a grapple comprising a first tine and a second tine for gripping the load;
a feller configured to cut the load;
a user input configured to receive a maximum gripping pressure setting from an operator;
a sensor configured to measure a pressure indicative of a pressure applied to the load by the grapple,
wherein the pressure is measured in a grapple close line,
wherein operation of the feller is based at least in part on the sensor measurement; and
a controller for controlling the pressure applied by the grapple such that the indicative pressure is at or below the maximum gripping pressure,
an interlock for restricting operation of the feller,
wherein the interlock is released when the felling grapple is in a grapple holding mode and the measured pressure is above a minimum threshold.

10. The felling grapple of claim 9, wherein the pressure applied to the load is controlled through a valve to hold a substantially constant pressure at or below the maximum gripping pressure.

11. The felling grapple of claim 10, wherein an alert is sent to the operator when the pressure is held at the substantially constant pressure.

12. The felling grapple of claim 11, wherein the grapple is moved under a constant cylinder pressure when the load shifts in the grapple.

13. The felling grapple of claim 12, further comprising releasing the pressure applied to the load when a manual release valve is activated.

14. The felling grapple of claim 10, wherein the pressure applied to the load is adjusted while the load is secured by the grapple.

15. A felling grapple for gripping a load comprising:
a grapple comprising a first tine and a second tine for gripping the load;
a feller configured to cut the load;
a cylinder configured to supply hydraulic fluid to the grapple;
a sensor configured to measure a pressure indicative of a pressure applied to the load by the grapple,
wherein the pressure is measured in a grapple close line,
wherein operation of the feller is based at least in part on the sensor measurement; and
a valve in fluid communication with the cylinder and supplying the hydraulic fluid for operating the first tine and the second tine,
wherein at least one operation of the feller is disabled when the pressure measurement drops below a minimum pressure threshold;
a manual releasing mechanism operable to release fluid from the cylinder via the grapple close line when the felling grapple is in a grapple holding mode,
wherein the manual releasing mechanism is disposed at a base of a utility vehicle.

16. The felling grapple of claim 15, wherein the valve between a hydraulic pressure source and the grapple remains open allowing the hydraulic pump to supply a substantially constant pressure during the grapple holding mode.

17. The felling grapple of claim 16, wherein the grapple is configured to move in the event that the load shifts in the grapple maintaining the substantially constant pressure on the load.

18. The felling grapple of claim 15, wherein the valve is closed and the pressure for securing the load is contained between the valve and the grapple.

19. The felling grapple of claim 15, further comprising an interlock for locking the feller when the grapple holding mode is active and the pressure is above the minimum pressure threshold.

20. The felling grapple of claim 15, wherein the interlock is only disabled when the felling grapple is in the grapple holding mode.

* * * * *